(No Model.)
S. LUTZ.
FREIGHT TRUCK.
No. 302,855. Patented July 29, 1884.
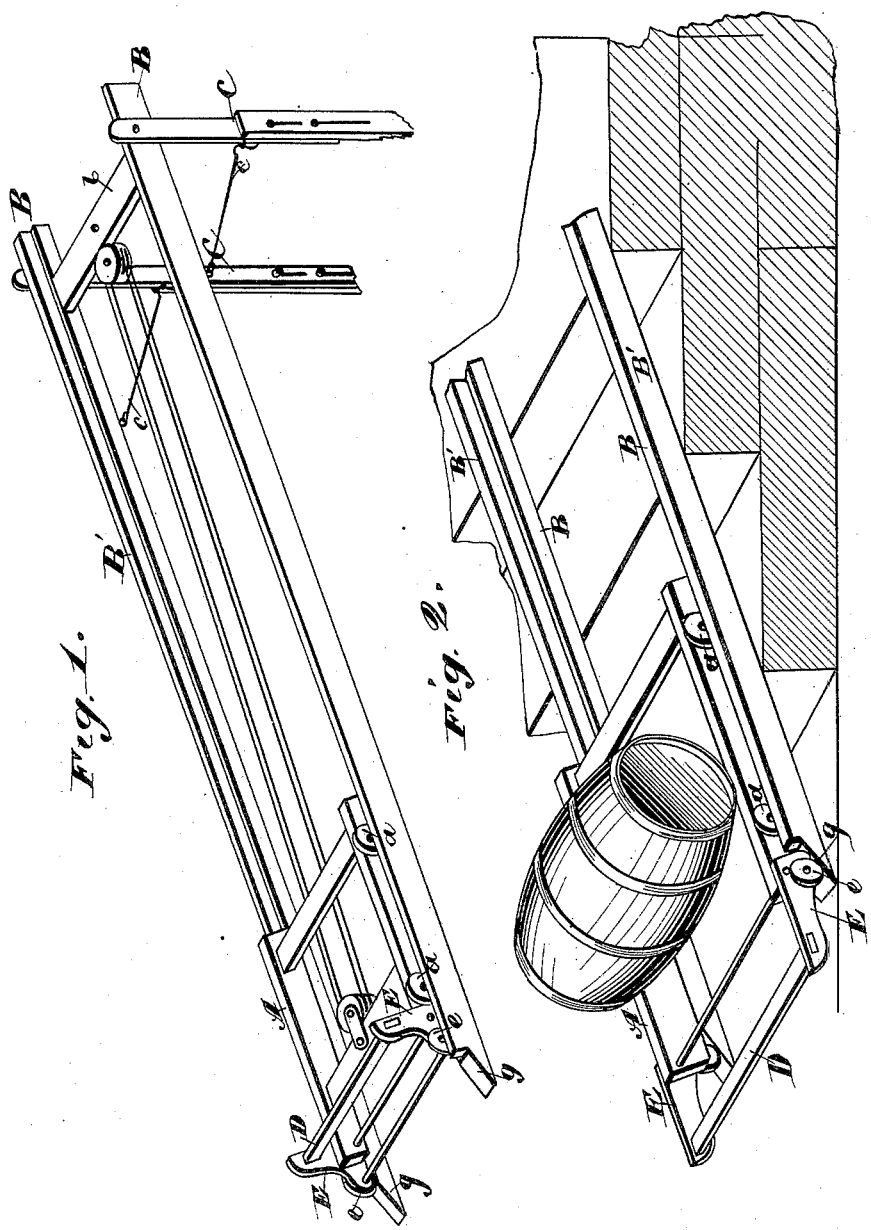
WITNESSES
Wm. M. Monroe
Geo. W. King
INVENTOR
Sylvester Lutz
by
Leggett & Leggett
Attorneys

UNITED STATES PATENT OFFICE.

SYLVESTER LUTZ, OF FLAT ROCK, OHIO.

FREIGHT-TRUCK.

SPECIFICATION forming part of Letters Patent No. 302,855, dated July 29, 1884.

Application filed April 8, 1884. (No model.)

*To all whom it may concern:*

Be it known that I, SYLVESTER LUTZ, of Flat Rock, in the county of Seneca and State of Ohio, have invented certain new and useful Improvements in Freight-Trucks; and I do hereby declare the following to be a full, clear, and exact description of the invention, such as will enable others skilled in the art to which it pertains to make and use the same.

My invention relates to improvements in freight-trucks, the object being to provide a truck and portable skids for moving heavy freight up or down inclines, and provided with an automatic tail-board to hold the freight on the truck, and that also serves as an incline for loading the freight on the trucks.

With these objects in view my invention consists in certain features of construction and in combination of parts hereinafter described, and pointed out in the claims.

In the drawings, Figure 1 is a view in perspective of my improved truck and skid and adjustable legs. Fig. 2 is a view in perspective of a portion of the same in position, supported by stairs or steps.

A represents the truck that is mounted on the rollers *a* that travel on the ways or skids B, that are provided with side pieces, B', that guide the rollers. If preferred, the rollers *a* may have flanges to guide them, and the side pieces, B', be dispensed with. The ways B have cross-pieces *b* securing them and forming a portable frame that is provided with the legs C stayed by the brace-rods *c*. These legs are made of two pieces clamped together in any suitable manner, so that the legs may be adjusted lengthwise and made to support the skids on the incline desired. The legs are pivotally attached to the sides of the skids, so that they may be folded alongside of the frame, rendering the devices portable and convenient to operate on stairs and similar places.

A tilting tail-board is provided, consisting of levers E of the bell-crank variety, pivotally attached to the truck, as shown, and preferably connected with a cross-pin, D. The short arms of these levers are provided, respectively, with the rollers *e*, that roll on the ways B, and support the tail-board in an upright position to hold barrels or other freight on the truck. The lower ends of the ways are beveled or rounded off at *g*, and when the rollers *e* reach this point and pass down the beveled ends of the ways, the tail-board is lowered, as shown in Fig. 2, forming an incline over which the freight may be conveniently loaded on the truck. As the truck moves up the skid, the rollers *e* mount the inclines *g* and automatically raise the tail-board to the upright position shown in Fig. 1.

Tackle-blocks may be attached to the upper cross-piece, *b*, and to the truck, so that the latter may be operated up or down the ways B with ease and safety.

What I claim is—

1. The combination, with suitable ways or skids, of a truck and a tail-board pivoted thereto, the said ways and tail-board being so constructed and arranged that the latter is elevated and lowered automatically as it moves on the ways, substantially as set forth.

2. A freight-truck operating on ways or skids and provided with a cross-piece secured to an arm of each of two bell-crank levers that are pivoted to the truck, the other ends of the bell-crank levers being provided with rollers, and the skids provided with inclines for operating these rollers, and by means of which the tail-board is tilted and raised or lowered as the said rollers ascend or descend the said incline, substantially as set forth.

3. The combination, with ways or skids provided with beveled or rounded ends or equivalent devices, of a truck operating thereon and provided with bell-crank levers or equivalent devices, with rollers attached to one end of each of the levers and so arranged that the said rollers, in ascending or descending the said inclines, raise or lower the other ends of the levers, substantially as set forth.

4. The combination, with skids or ways adapted to support and operate a truck, as aforesaid, of adjustable legs adapted to be lengthened or shortened so as to support the skids at the desired angle, and pivotally attached or hinged to the skids in such a manner that the legs may be folded alongside the skid, substantially as set forth.

In testimony whereof I sign this specification, in the presence of two witnesses, this 20th day of March, 1884.

SYLVESTER LUTZ.

Witnesses:
  J. M. TERWILLIGER,
  SOLOMON SHERCK.